(12) United States Patent  
Janssen

(10) Patent No.: US 9,297,337 B2  
(45) Date of Patent: Mar. 29, 2016

(54) INTERNAL COMBUSTION AND WASTE HEAT STEAM ENGINE HAVING A HEAT RECOVERY STEAM GENERATOR EXHAUST MANIFOLD

(71) Applicant: Matthew A. Janssen, Sandpoint, ID (US)

(72) Inventor: Matthew A. Janssen, Sandpoint, ID (US)

( * ) Notice: Subject to any disclaimer, the term of this patent is extended or adjusted under 35 U.S.C. 154(b) by 125 days.

(21) Appl. No.: 14/257,843

(22) Filed: Apr. 21, 2014

(65) Prior Publication Data

US 2014/0311136 A1   Oct. 23, 2014

Related U.S. Application Data

(60) Provisional application No. 61/814,270, filed on Apr. 21, 2013, provisional application No. 61/814,271, filed on Apr. 21, 2013.

(51) Int. Cl.

| | |
|---|---|
| *F01N 3/02* | (2006.01) |
| *F02M 25/038* | (2006.01) |
| *F01N 5/02* | (2006.01) |
| *F02B 25/14* | (2006.01) |
| *F02M 25/022* | (2006.01) |
| *F02M 43/00* | (2006.01) |
| *F02B 33/38* | (2006.01) |
| *F02B 37/00* | (2006.01) |

(52) U.S. Cl.
CPC ............... *F02M 25/038* (2013.01); *F01N 5/02* (2013.01); *F02B 25/14* (2013.01); *F02B 33/38* (2013.01); *F02M 25/0228* (2013.01); *F02M 43/00* (2013.01); *F02B 37/00* (2013.01); *F02M 2200/95* (2013.01); *F02M 2700/4345* (2013.01); *Y02T 10/16* (2013.01)

(58) Field of Classification Search
CPC . F02M 25/038; F02M 43/00; F02M 25/0228; F01N 5/02; F02B 33/38; F02B 25/14
USPC .......................................................... 60/320
See application file for complete search history.

(56) References Cited

U.S. PATENT DOCUMENTS

| | | | |
|---|---|---|---|
| 659,837 A | 10/1900 | White | |
| 3,842,808 A * | 10/1974 | Cataldo | ................... F02B 47/02 123/143 R |
| 4,637,352 A * | 1/1987 | Green | ................. F02M 25/038 123/25 D |
| 6,170,441 B1 * | 1/2001 | Haldeman | ............... F02B 41/04 123/25 D |
| 2010/0077986 A1 * | 4/2010 | Chen | .................... F02M 25/038 123/25 C |
| 2014/0230778 A1 * | 8/2014 | Grannell | ............. F02M 25/038 123/25 P |

FOREIGN PATENT DOCUMENTS

WO    WO 2010030864 A2 *   3/2010   ................ F01N 5/02

* cited by examiner

*Primary Examiner* — Jason Shanske  
(74) *Attorney, Agent, or Firm* — Randall / Danskin, P.S.

(57) ABSTRACT

An improved internal combustion and waste hat steam engine having an heat recovery steam generator optimized for the steam cycle, that can operate on steam, fuel, or a water-fuel composition where the mixture is at a critical temperature and in a homogeneous single phase. The condensing waste heat recovery steam generator exhaust manifold is close-coupled to the engine cylinder exhaust ports and provides heat to create the homogeneous mixture and steam. The primary heat source is internal combustion. An external heat source may be coupled with the engine to increase the heat available to the condensing waste water recovery steam generator exhaust manifold to produce additional steam. The engine can be operated as a pure diesel engine, for warm-up or for when an external source of steam is desired.

19 Claims, 12 Drawing Sheets

INTERNAL COMBUSTION AND WASTE HEAT STEAM ENGINE HAVING A HEAT RECOVERY STEAM GENERATOR EXHAUST MANIFOLD

RELATED APPLICATIONS

This utility patent application claims the benefit of earlier filed U.S. Provisional Patent Application No. 61/814,270 filed on Apr. 21, 2013, titled Dual Cycle Internal Combustion and Steam Engine, and earlier filed U.S. Provisional Patent Application No. 61/814,271 filed on Apr. 21, 2013, titled Condensing Heat Recovery Steam Generator Exhaust Manifold. The entire contents of the above-identified U.S. Provisional patent applications are expressly incorporated herein by this reference.

BACKGROUND OF THE INVENTION

1. Field of Invention

The present invention relates to engines, and more particularly to a loop-scavenged internal combustion engine having a heat recovery steam generator exhaust manifold ("HRSG") to produce steam for injection into the cylinders.

2. Background Art

It is generally accepted the conventional steam engine technology matured in the 1950s, and even today steam engines are criticized for low efficiency.

The low operational efficiency of the steam engine is reflected primarily by the energy required to convert water into steam, which is approximately 1000 Btu's per pound of water to make 1 pound of steam. Additionally, the Water Rate of the steam engine (pounds (lbs) of steam it takes to generate 1 horsepower) is affected by the initial steam pressure, exhaust backpressure, and whether the steam engine is of the counterflow type or uniflow type.

In a counterflow type steam engine, the inlet and exhaust passages are located in the cylinder head, and cool exhaust gasses must pass over hotter cylinder walls and the cylinder head during the exhaust stroke, thereby cooling the surfaces below the temperature of the incoming inlet steam. This causes condensation on the cylinder walls and removes lubrication. The incoming steam therefore has to reheat the head and cylinder walls back up to the inlet steam temperature before useful work can be generated.

"Initial condensation" refers to a loss of steam pressure before work occurs due to condensation of the incoming inlet steam. The cause of initial condensation is related to and a component of "wall effects" which is an industry reference to the "missing quantity" of steam between the steam consumption shown in the indicator diagram (pressure volume diagram) and direct measurement, where the theoretical amount of missing steam is less than the actual amount. It relates to the chilling of the interior passages and surfaces or "walls" of the steam engine that are swept by the exhaust steam. If the temperature of the walls is higher than the steam saturation temperature, no condensation occurs, and the heat transfer follows "gas laws," the loss being very small. However, if the temperature of the walls is below the saturation temperature of the incoming inlet steam, condensation occurs. Condensation results in a loss of pressure, which is the driving force of the steam engine. In certain designs, particularly counterflow steam engines, where the exhaust steam retraces the inlet steam admission path, condensation is large. The ratio of expansion between the inlet and exhaust steam relates to the mean temperature of the walls in the counterflow type steam engine. For high expansion rates, superheating the admission steam raises the wall temperatures and is partially effective at minimizing wall effects. Even though waste heat is recovered (transferred back into) the exhaust steam of the counterflow type steam engine, a rise in entropy occurs leading to an irreversible loss according to the second law of thermodynamics. Decreasing the expansion ratio, or temperature difference between admission steam and exhaust steam, is also effective at reducing wall effects of a counterflow type steam engine. Two techniques that maintain a high expansion ratio, yet limit the temperature difference, are the use of multiple cylinders to expand the steam (known as compounding), the preventing the incoming inlet steam from retracing its path in the engine, which is known as a uniflow type or Unaflow type steam engine.

During steady operation of a uniflow type steam engine, the temperature of the engine surfaces exposed to incoming inlet steam stays very close to the temperature of the incoming inlet steam (suffering primarily only radiation losses) and as the cylinder walls are exposed as the piston moves, the temperature corresponds closely to the expansion of the steam in the cylinder, resulting in minimal heat loss. Steam is exhausted through exhaust ports at the termination of the stroke. The uniflow type engine is currently the best known principle for reducing irreversible thermodynamic losses in steam engines. The uniflow principle, along with compounding, is exemplified in contemporary multistage steam turbines. In uniflow type steam engines, the surfaces exposed to inlet steam are reservoirs, or interconnected steam chests, for incoming inlet steam. During expansion of the steam admitted to the cylinder, the surfaces are heated by the reservoirs. As the piston returns to Top Dead Center (TDC), heat from compression is transferred to the reservoirs. In this way, entropy is minimized.

In a uniflow type steam engine, steam enters from the cylinder head and travels down the cylinder as it expands and cools to an exhaust port near the end of the stroke. The exhaust steam never retraces the path of incoming inlet steam. In practice, the uniflow principle yields an approximate 20% reduction in water rate over the counterflow type steam engine at the same operating conditions.

In addition to low operational efficiency, known steam engines commonly require complex valve apparatus and relatively large valves (due to low/intermediate inlet pressure) as well as a boiler, and often a condenser, a hot well, a deaerator, and many other auxiliary systems to function. These greatly increase the complexity and expense of a steam engine power system. While the uniflow principle dramatically improved the efficiency of the steam engine, steam engines were ultimately superseded by diesel engine technology. However, diesel engine technology is not without drawbacks, which include, low operational efficiency, poor combustion, the need for exhaust after-treatment, the need for complex valve apparatus and large intake valves, and the need for large capacity water-cooling systems to absorb waste heat and reduce thermal loading.

One noted problem with diesel internal combustion engines is their low operational efficiency. This is reflected by their generation of waste of heat of combustion that is ejected into the atmosphere with exhaust gases and into the water or air cooling system (about 30% and 25% of the energy content of the fuel, respectively). The internal combustion engine is further handicapped in that combustion must occur quickly as a timed event. To increase the quality of this combustion event, high pressures (frequently in excess of 30,000 psig) are used in diesel engine fuel injectors to create a more homogeneous fuel and air mixture to improve combustion and lessen production of soot. At high specific power outputs, the combustion temperature of diesel fuel may exceed 2200F.

If the temperature and pressure are not correct, poor combustion occurs. Complex and expensive exhaust after-treatment is often used to correct the symptoms of poor combustion, but in so doing, these systems may further decrease fuel efficiency by up to 20%. Systems such as Diesel Particulate Filters (DPFs) with onboard regeneration use raw fuel to regenerate the filtering media, while Exhaust Gas Recirculation (EGR) catalytic converters and Selective Catalyst Reduction Systems (SCR) may increase exhaust backpressure. These systems further reduce fuel efficiency. EGR systems may also re-introduce soot into the cylinders, causing increased wear as well as contamination of engine oil and thereby increasing wear and tear on the engine.

In addition to low operational efficiency, internal combustion engines typically require complex valve apparatus and large intake valves because the inlet pressure is low.

Moreover, often a water cooling system is required to absorb waste heat, greatly adding to the expense of the engine system, increasing weight and increasing complexity, because demands to carry water must be created within the engine during manufacture.

Similar to what happened to steam engine technology, conventional internal combustion engine technology has also reached a mature state of development where only small incremental improvements are achieved at great expense. Like the steam engine, the internal combustion engine faces continually increasing expectations of performance, efficiency, and emissions quality, yet an improvement in one desirable feature is often made at the expense of another.

There is a need to optimize the internal combustion engine and the steam cycle to be thermally uniflow, to maximize the efficiency of the steam cycle and to capture other desirable elements of the steam engine, while reducing complexities and expense.

There is also a need to avoid large low pressure valves and valve apparatus.

There is a need to eliminate soot formation associated with known two-stroke engines.

There is a need for an engine that requires less outside energy and requires less combustion in the cylinder per brake horsepower, thereby decreasing the products of combustion that may be present in the exhaust and require after-treatment systems.

Forced-flow steam generators are used to generate steam rapidly, safely, and economically. In heat recovery applications, layers of spiral-wound coils are used, and while effective at providing a highly efficient heating surface, this arrangement requires a prohibitively large structure in order to define the necessary volume for operation, and the large structure must be mounted on a framework that is generally distal from the engine, which decreases the amount and quality of heat available for recovery.

The concept of supercritical steam generation can be traced to Mark Benson, who in 1922 patented a process for the generation of working steam ready for use at any desired pressure. Benson's objective was to generate steam that avoids evaporation. Benson believed that at less than critical pressure, bubbles of steam would occupy so much of a boiler tube's surface that the bubbles would slow down the transmission of heat between the tube wall and the water. According to Benson operation at critical pressure provides the highest available heat transfer efficiency. The Benson boiler's output is throttled through a pressure-reducing valve (commonly referred to as an evaporator) to produce dry, subcritical steam.

There is a need to optimize steam generation such that supercritical steam, high temperature steam, high temperature water, or greatest water/steam temperature generation can be created from the heat of a reciprocating engine's exhaust, while still providing the convenience of an easily removed and serviceable assembly in the form of an exhaust manifold, header, and/or exhaust pipe.

There is a need for a heat recovery steam generator that monitors and maintains the temperature of the output of each steam coil the same on a multi-cylinder engine, which may selectively load cylinders and may have independent heat rejection rates for each cylinder.

There is a need for an engine that requires less outside energy and requires less combustion in the cylinder per brake horsepower.

As described, some or all of the drawbacks and problems explained above, and other drawbacks and problems, may be helped or solved by my invention shown and described herein. My invention may also be used to address other problems not set out herein or which become apparent at a later time. The future may also bring to light unknown benefits that may, in the future, be appreciated from my novel invention shown and described herein.

My invention does not reside in any one of the identified features individually, but rather in the synergistic combination of all of its structures, which give rise to the functions necessarily flowing therefrom as hereinafter specified and claimed.

BRIEF SUMMARY OF THE INVENTION

An improved uniflow internal combustion and waste heat steam engine having a heat recovery steam generator exhaust manifold that collects and uses wasted heat from combustion exiting exhaust ports to generate steam which is thereafter injected into the cylinders with fuel as a homogenous mixture to improve the efficiency and generate more horsepower per unit of fuel and per unit of steam.

My invention is an improvement over known technology because my improved engine is thermally optimized to operate on steam; fuel; and a water-fuel mixture having critical pressure and temperature so the mixture is homogeneous; my engines' two cycles are thermally uniflow; it provides a heat recovery steam generator communicating with the engine exhaust ports; it provides a high pressure fuel/steam injector for injection of a homogeneous mixture of fuel and steam into the combustion cycle; and it supports a supplemental fuel burner.

In providing such an apparatus, it is:

a principal object to provide an improved engine wherein thermodynamic losses of initial condensation and wall effects in the steam cycles are minimized by making the cycles thermally uniflow.

a further object to provide an improved engine having an injector that can provide pure fuel or a mixture of fuel and steam at supercritical pressures and temperatures as well as fuel and homogenous supercritical mixtures of steam and liquid and small-particle solid fuel.

a further object to provide an improved engine wherein valves and valve apparatus are eliminated by using a loop scavenge arrangement that is port-controlled.

a further object to provide an improved engine where air for internal combustion is admitted near the termination of the piston stroke by ports defined in the cylinder, whereby if the air's temperature is less than that of the cylinder, the air is gradually heated as it scavenges combustion gasses, minimizing cooling of the cylinder a further object to provide an improved engine wherein elements of a high efficiency steam cycle are preserved while providing for internal combustion of fuel.

a further object to provide an improved engine wherein high specific power outputs can be achieved without thermal overloading of the cylinders, because steam in the cylinders absorbs and removes much of the heat of combustion.

a further object to provide an improved engine wherein operation is possible in various applications (e.g., road, locomotive, generator) at higher performance marine ratings (where cooling water is unlimited) for increased time periods because combustion is tempered with steam injection, which serves to augment the pressure created by the combustion with the steam pressure to push the pistons, such that the engine may operate at high performance marine intermittent-duty ratings while on land in continuous duty with no thermal overloading.

a further object to provide an improved engine wherein the need for an engine cooling system which may include a radiator, water pumps, or associated liquid-cooling system machinery is reduced because steam in the cylinder can absorb heat beyond its saturation temperature and can remove the heat quickly out of the exhaust ports.

a further object to provide an improved engine wherein the cylinders and combustion chambers are jacketed with steam allowing simpler design, construction, and operation because of the lack of necessity of water-cooling.

a further object to provide an improved engine wherein its uniflow design reduces the surface area to which the admitted steam is exposed to reduce initial condensation and wall effects.

a further object to provide an improved engine wherein the fuel and steam injection in the cylinders can be controlled independently.

a further object to provide an improved engine wherein steam can be added to the cylinder in combination with the fuel to control temperature and improve fuel atomization, resulting in optimized combustion.

a further object to provide an improved engine wherein steam pressures and temperatures are generated where a water-fuel mix may be maintained at homogeneous single phase state when delivered to combustion chamber, thus reducing fuel droplet size to a homogeneous gas, and reducing soot formation. For certain mixtures of fuel and water, such as those with diesel, the formation of a homogeneous supercritical mixture may occur at pressure of approximately between 2,800-3,000 psig and temperatures of approximately between 650 F. to 685 F., while for other hydrocarbon fuels, such as a solid fuel such as biomass, the pressures may be approximately 3,250 psig and the temperatures may be approximately 750 F. In nearly all cases, conditions of approximately between 4,000 psig and approximately 750 F. are sufficient for the desired reactions, and pressure would only be raised to improve the quality or speed of fuel injection.

a further object to provide an improved engine wherein the steam pressure and temperature can be subcritical.

a further object to provide an improved engine wherein a supplementary fuel burner can provide actual heat to generate more steam than is provided by the engine's exhaust.

a further object to provide an improved engine wherein, when operating as a dual cycle engine, performance in a wide performance envelope is possible while still maintaining high efficiency.

a further object to provide an improved engine that can operate efficiently as a pure internal combustion engine at low specific loads, during warm-up or where an external source of steam is desired.

a further object to provide an improved engine that may operate on stored steam, may operate on steam generated from an external source, and can operate on steam generated by waste heat of combustion.

a further object to provide an improved engine wherein, with a source of steam, the steam cycle can provide greater torque at slow speeds than known internal combustion engines, which may reduce drive requirements allowing for reduced gearing (transmission speeds) because the engine has a broader torque curve.

a further object to provide an improved engine wherein a condensing waste heat recovery steam generator exhaust manifold can be coupled to the exhaust ports of the engine's cylinders to provide heat recovery from the exhaust.

a further object to provide an improved engine wherein the lower amount of outside energy required and less combustion required in the cylinder per brake horsepower results from more steam being generated, which results in more efficient power generation.

a further object to provide an improved engine wherein the products of combustion that may be present in the exhaust and require after-treatment systems are decreased.

a further object to provide an improved engine having a condensing heat recovery steam generator exhaust manifold carrying mono-tube steam generators for each cylinder operating in parallel, a further object to provide an improved engine having a condensing heat recovery steam generator exhaust manifold wherein the gas and water flows are optimally counterflow which allows the highest possible temperature to be achieved, approaching the combustion exhaust gas temperature at the engine's exhaust valve or port.

a further object to provide an improved engine wherein cold water may be introduced to the heat recovery steam generator exhaust manifold with a minimum negative consequence to steam production and temperature.

a further object to provide an improved engine wherein the heat recovered cools the exhaust, allowing for greater thermal loading of the cylinder.

a further object to provide an improved engine wherein the steam or hot water may be used for such purposes as driving a steam driven-load external to the engine, or providing steam or hot water to the engine itself to augment and/or enhance internal combustion.

a further object to provide an improved engine wherein a condensing heat recovery steam generator exhaust manifold is provided immediately adjacent to the engine's exhaust ports to capture the heat of the exhaust to generate steam for use by the engine with a steam cycle or use by the engine and support of an outside steam-driven process or storage.

a further object to provide an improved engine wherein steam is used in the engine or introduced to the gas flow of the heat recovery steam generator exhaust manifold from an external source.

a further object to provide an improved engine wherein the heat recovery steam generator exhaust manifold acts as a condenser and lowers the gas temperature to the point where the steam in the exhaust condenses and water is recovered.

a further object to provide an improved engine wherein the heat recovery steam generator can keep the temperature of the output of each steam coil the same on a multi-cylinder engine, which may selectively load cylinders and may have independent heat rejection rates for each cylinder.

a further object to provide an improved engine wherein the heat recovery steam generator provides an individual circuit comprised of a set of coils for each cylinder, such that a specific water flow may be forced through each coil set to accommodate each cylinder's heat ejection rate while maintaining uniform temperature of the output of all coil sets.

a further object to provide an improved engine wherein the heat recovery steam generator is comprised of tandem wound coils for each cylinder, such that a specific water flow may be forced through each coil to accommodate the cylinder's heat ejection rate to maintain the same output temperature of all coil sets a further object to provide an improved engine wherein a greater volume water flow may be forced through the circuit to accommodate each cylinder's heat ejection rate and to create the same output temperature of all coils.

a further object to provide an improved engine having a collector of the individual gas paths of each cylinder where an auxiliary heat input may be added.

a further object to provide an improved engine wherein steam generation from the heat of the engine's exhaust is optimized, such that where the highest grade heat is closest to the exhaust port, the heat recovery steam generator coils are positioned as close to each individual cylinder exhaust port as possible while providing the convenience of an easily removed and serviceable assembly in the form of an exhaust manifold, header, and/or exhaust pipe.

a further object is to provide such a dual cycle internal combustion and steam engine that yields improved combustion and which reduces soot formation compared to a four-stroke engine because my improved engine completes a power cycle in one crankshaft revolution with only two strokes (up and down movements) of the piston. My improved engine can accomplish this because the end of the combustion stroke and the beginning of the compression stroke happens simultaneously, and the intake and exhaust ("scavenging") functions are performed at the same time.

a further object is to provide an improved engine where a water-hydrocarbon fuel mixture may be maintained at a homogeneous state and delivered to the combustion chamber where the mixture will combust more quickly and completely because liquid droplets associated with typical diesel fuel injection systems are eliminated.

a further object to provide an improved engine that may be used as a processor of fracking wastewater.

a further objective is to condense exhaust steam into water for reuse in a engine's steam cycle.

Other and further objects of my invention will appear from the following specification and accompanying drawings which form a part hereof. In carrying out the objects of my invention, it is to be understood that its structures, features, and steps are susceptible to change in design and arrangement with only one preferred and practical embodiment of the best known mode being illustrated in the accompanying drawings and specified as is required.

BRIEF DESCRIPTION OF DRAWINGS

Specific forms, configurations, embodiments and/or diagrams relating to and helping to describe preferred versions of my invention are explained and characterized herein, often with reference to the accompanying drawings. The drawings and all features shown therein serve as part of the disclosure of my invention, whether described in text or merely by graphical disclosure alone. Such drawings are briefly described below.

In the accompanying drawings, like numbers refer to similar parts throughout. Arrows in the drawings depict the direction of flow of gasses and the direction of rotation of rotating components.

DETAILED DESCRIPTION OF THE INVENTION

The readers of this document should understand that the embodiments described herein may rely on terminology used in any section of this document and other terms readily apparent from the drawings and the language common therefore as may be known in a particular art and known or indicated or provided by dictionaries. Dictionaries were used in the preparation of this document. Widely known and used in the preparation hereof are *Webster's Third New International Dictionary* (©1993), *The Oxford English Dictionary* (Second Edition, ©1989), *The New Century Dictionary* (©2001-2005) and the *American Heritage Dictionary of the English Language* (4th Edition©2000) all of which are hereby incorporated by this reference for interpretation of terms used herein to more adequately or aptly describe various features, aspects and concepts shown or otherwise described herein.

This document is premised upon using one or more terms or features shown in one embodiment that may also apply to or be combined with other embodiments for similar structures, functions, features, and aspects of the invention. Wording used in the claims is also descriptive of the invention and the text of both claims and abstract are incorporated by reference into the description entirely. Terminology used with one, some, or all embodiments may be used for describing and defining the technology and exclusive rights associated herewith.

The readers of this document should further understand that the embodiments described herein may rely on terminology and features used in any section or embodiment shown in this document and other terms readily apparent from the drawings and language common or proper therefore.

Figure 1:
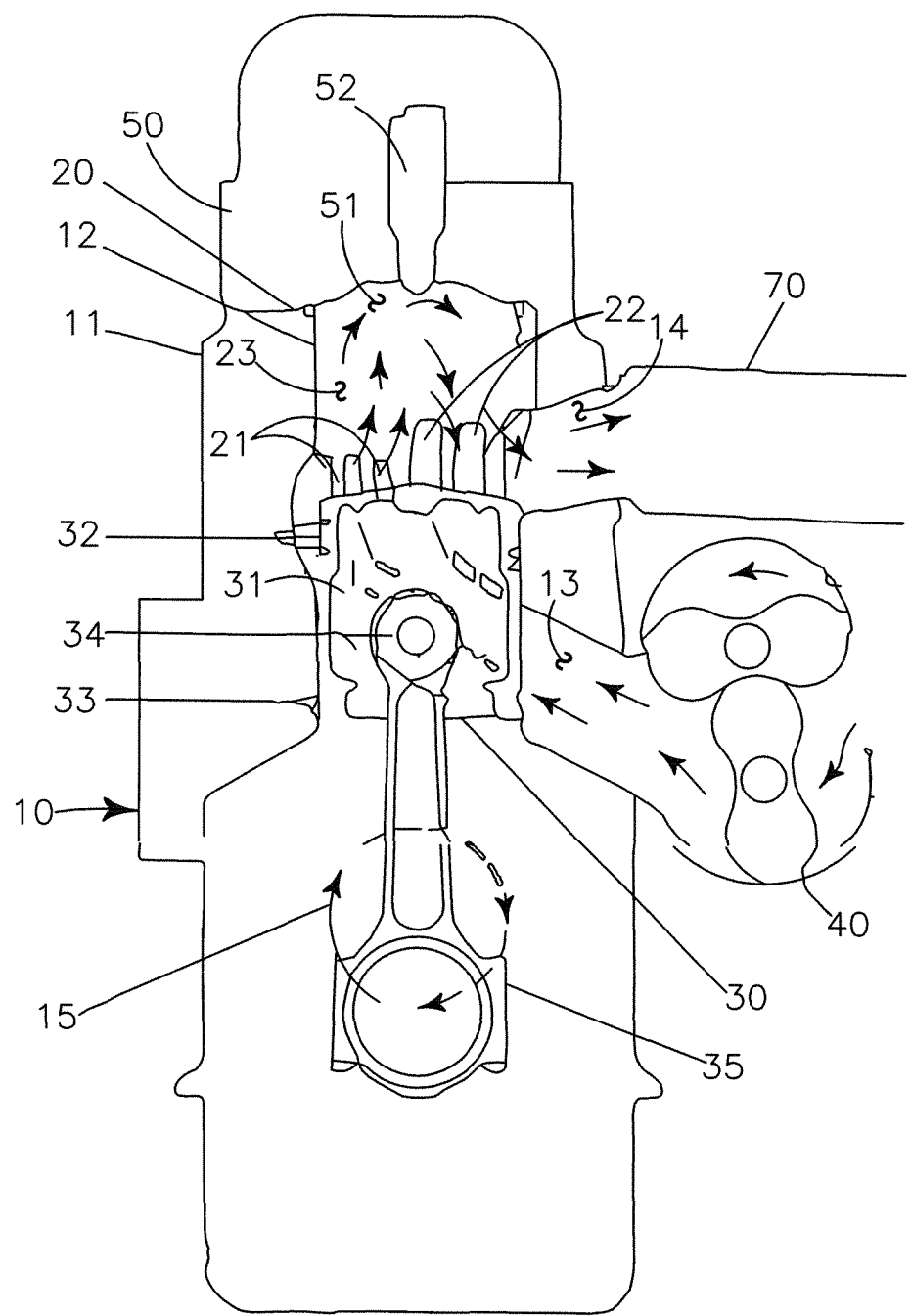
FIG. 1 is an orthographic vertical cross-section view of a cylinder of my internal combustion and steam engine during the scavenging phase taking place from Bottom Dead Center (BDC) while the air inlet and exhaust ports are open and exposed.

Referring now to the drawings and more particularly, FIG. 1, my improved engine generally comprises a body 10 defining at least one and preferably plural cylindrical bores 12, an air inlet passage 13, an exhaust passage 14, and an Heat Recovery Steam Generator (HRSG) based after referral to as 60.

The cylinder bore 12 is fitted with a replaceable generally tubular cylinder liner 20, which defines a medial channel 23 extending therethrough which has an upper end portion (not shown) that is immediately adjacent a cylinder head 50. A combustion chamber 51 is defined within the medial channel 23 of the cylinder liner 20 below the cylinder head 50 and above a piston 31 carried within the cylinder liner 20.

The piston 31 is reciprocally carried within the cylinder liner 20, and reciprocating movement of the piston 31 within the liner 20 opens and closes the air inlet ports 21 and the exhaust ports 22, which are defined in the cylinder liner 20 at an end portion of the cylinder liner 20 distal from the cylinder head 50. The piston 31 is mechanically interconnected to a connecting road 35 by means of piston pin 34 that extends diametrically through the piston 31 and an upper end portion of the connecting road 35. A lower end portion of the connecting road 35 is rotatably interconnected with a crankshaft that rotates as a result of the reciprocating movement of the piston 31.

The air inlet ports 21 defined in the cylinder liner 20 communicate with an air inlet passage 13 which communicates with an air moving means 40 such as, but not limited to, a supercharger and/or turbocharger to supply pressurized air to the air inlet passage 13 and air input ports 21. Cylinder bridges (not shown) separate the spacedly arrayed air inlet ports 21. The function of the bridges (not shown) is to maintain piston compression rings 32 at a constant diameter as the piston 31 moves across the air input ports 21. The air inlet ports 21 are beveled to aid the loop scavenging.

The exhaust ports 22 communicate with exhaust passages 14, which communicate with the condensing heat recovery steam generator exhaust manifold 70. The function of the exhaust ports 22 is to allow exhaust combustion gasses to escape the combustion chamber 51. Placement of the air inlet ports 21 and exhaust ports 22 within the cylinder liner 20 controls the timing of air intake and exhaust events. The area of the air inlet passage 13 and the area of the air inlet ports 21 have a direct effect on the velocity of scavenging air flowing into the combustion chamber 51. The design, configuration and placement of the air inlet ports 21 and the bridges (not shown) defined in the cylinder liner 20 directly affects the velocity of the air input. The slope of the air inlet passage 13 provides general guidance and direction of air flow.

The exhaust ports 22 are preferably spacedly arrayed on one side of the cylinder liner 20, and the air inlet ports 21 are similarly spacedly arrayed about the inner circumferential surface of the cylinder liner 20. The dimensions, including the vertical lengths of the air inlet ports 21 and exhaust ports 22 directly affect the power and compression strokes of the piston 31, as well as the length of time available for scavenging.

Figure 2:
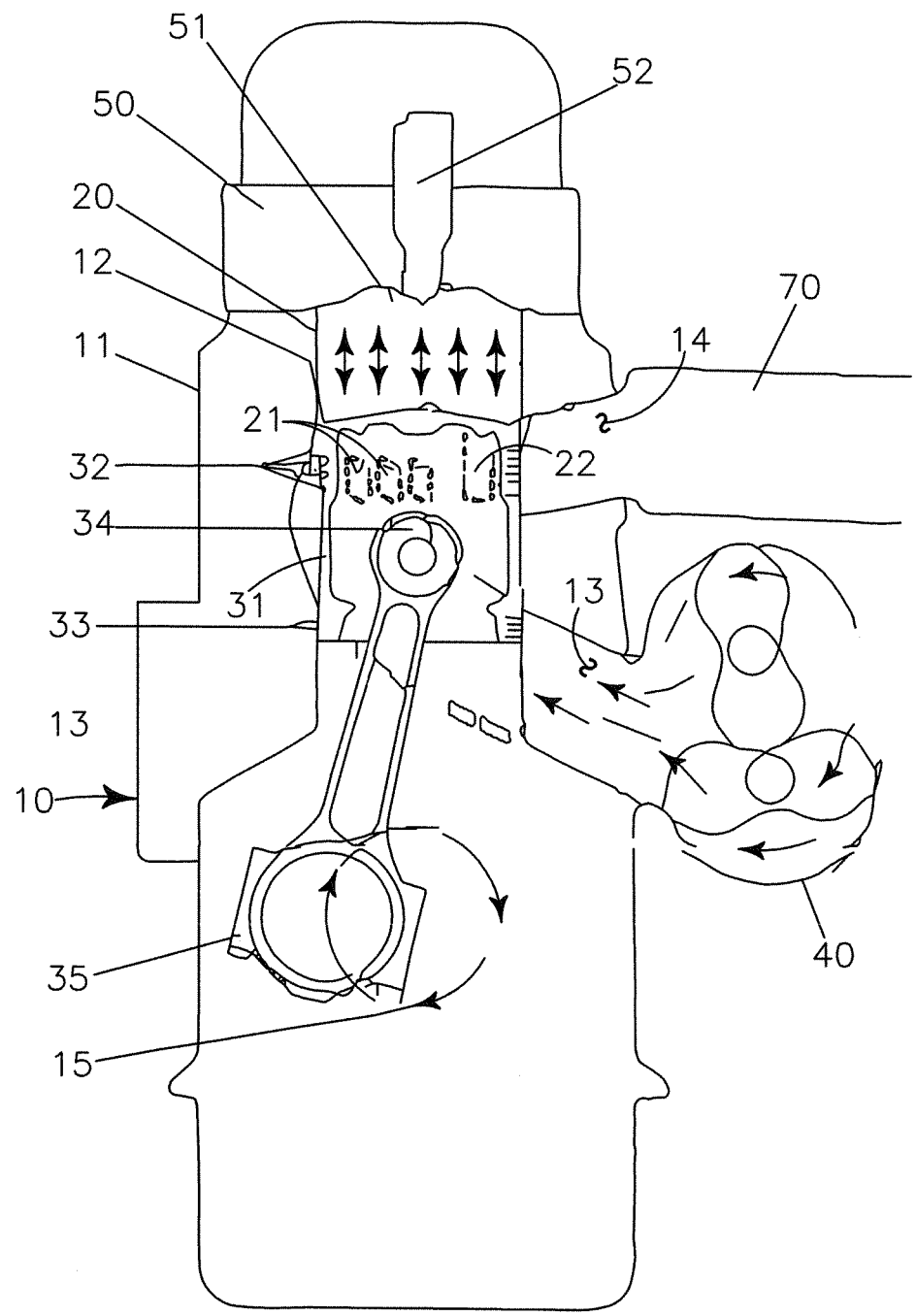
FIG. 2 is an orthographic cross-section view, similar to that of FIG. 1, during the compression phase of the upward stroke after the admission of the intake air and the exhaust ports are covered.

Referring to FIG. 1 and FIG. 2, my improved internal combustion and waste heat steam engine having a heat recovery steam generator 60 uses an air moving means 40 that forces air into the combustion chamber 51 under pressure to improve combustion. In the preferred embodiment, the air moving means 40 may be, but is not limited to, a supercharger and/or turbocharger that charges the air inlet passage 13 with pressurized air. Fresh air is forced into the cylinder liner 20 combustion chamber 51 via the air inlet passages 13 within the cylinder block 11, and through the air inlet ports 21 machined into the cylinder liners 20.

The injected fresh air pushes combustion gasses and steam from a previous combustion event out of the combustion chamber 51 though the exhaust ports 22 defined in the cylinder liner 20.

Figure 7:
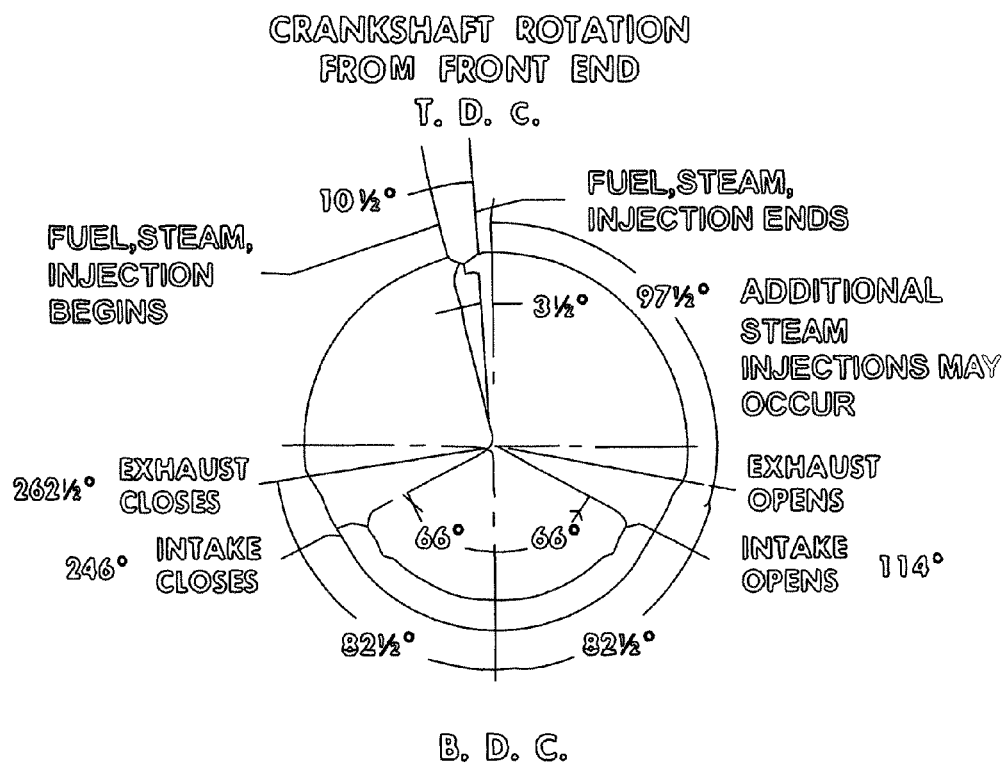
FIG. 7 is a diagram showing the events of FIGS. 1 to 4 taking place by crank angle degrees.

The air inlet ports 21 defined in the cylinder liner 20 have lower edge portions (not shown) which are approximately vertically level with the lower edge portions of the exhaust ports 22 which are approximately vertically level with an upper surface of the piston 31 when the piston 31 is in its lowest position, known as bottom dead center (BDC). (FIGS. 1, 7). The air inlet ports 21 have a configuration that directs the charged, incoming, fresh air upwardly into the combustion chamber 51, and thereafter the air moves down the cylinder liner 20 to the exhaust ports 22, effectively sweeping combustion products including gasses and steam out of the combustion chamber 51 and re-filling the combustion chamber 51 with fresh pressurized air.

Figure 3:
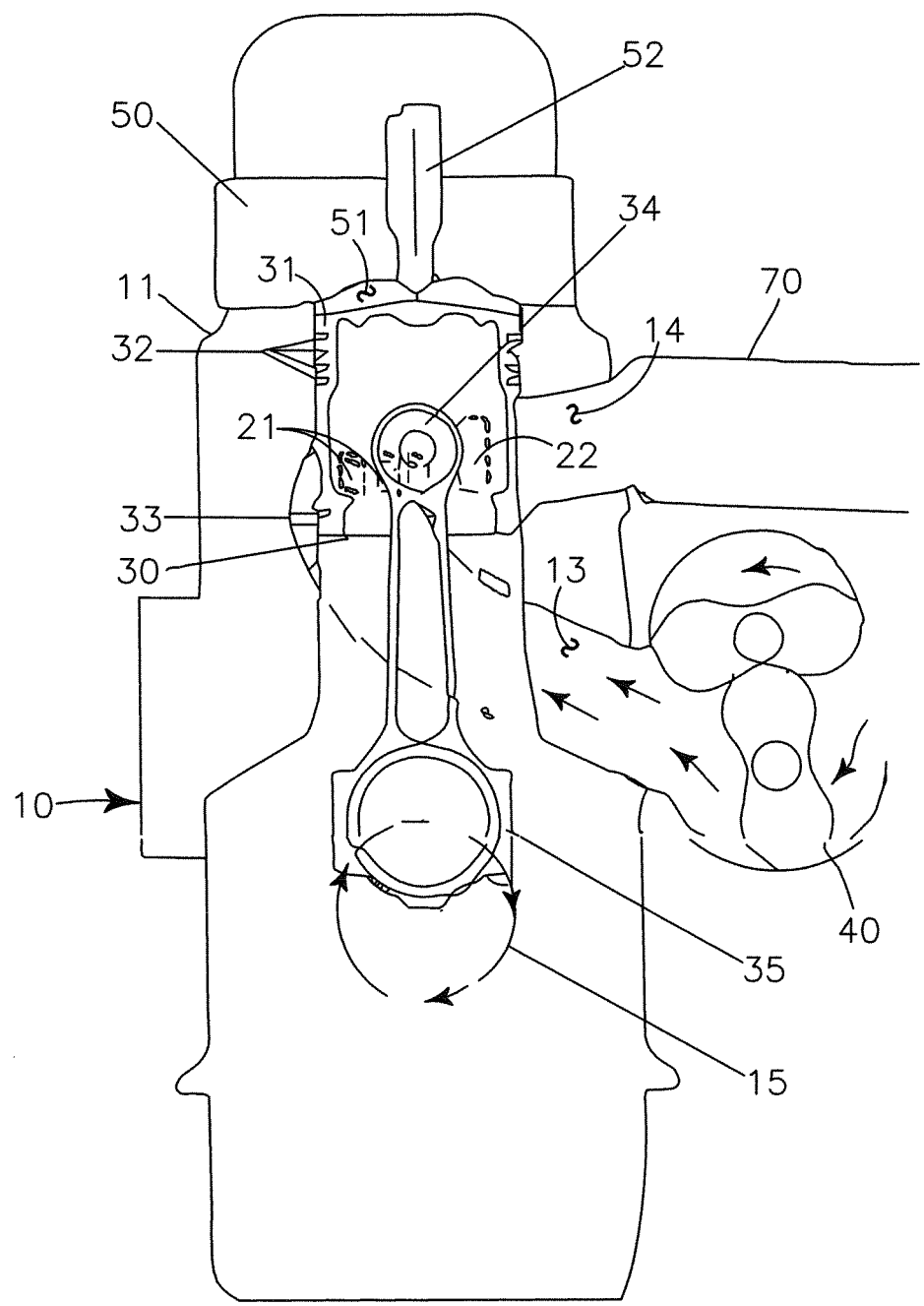
FIG. 3 is an orthographic cross-section view, similar to that of FIG. 1, during the combustion phase, which occurs near Top Dead Center (TDC).

Still referring to FIG. 1 and FIG. 2, the piston compression rings 32 create a seal between the inner circumferential surface of the cylinder liner 20 and the outer circumferential surface of the piston 31, such that the piston 31 within the cylinder liner 20 controls the amount of area (volume) above the piston 31 which is defined by the cylinder liner 20, the top of the piston 31, and the cylinder heat 50. The piston 31, by its upward movement from BDC, FIG. 2, first covers the air inlet ports 21 and then the exhaust ports 22. As soon as the exhaust ports 22 are covered (FIG. 2), the fresh air trapped within the combustion chamber 51 begins to be compressed by the piston 31 until the piston 31 at top dead center (TDC) (FIGS. 3, 7) has compressed the air to approximately one-eighteenth of its original volume.

Shortly before the piston 31 reaches TDC (FIG. 3), an amount of highly atomized fuel, homogeneous steam-fuel mixture, steam, and/or water is injected into the combustion chamber 51 by an injector 52. Any fuel present in the injected mixture is ignited by the heat generated by the compression stroke. Pressure from the resulting combustion and expanding gasses force the piston 31 downward, producing the power at crankshaft.

Figure 4:
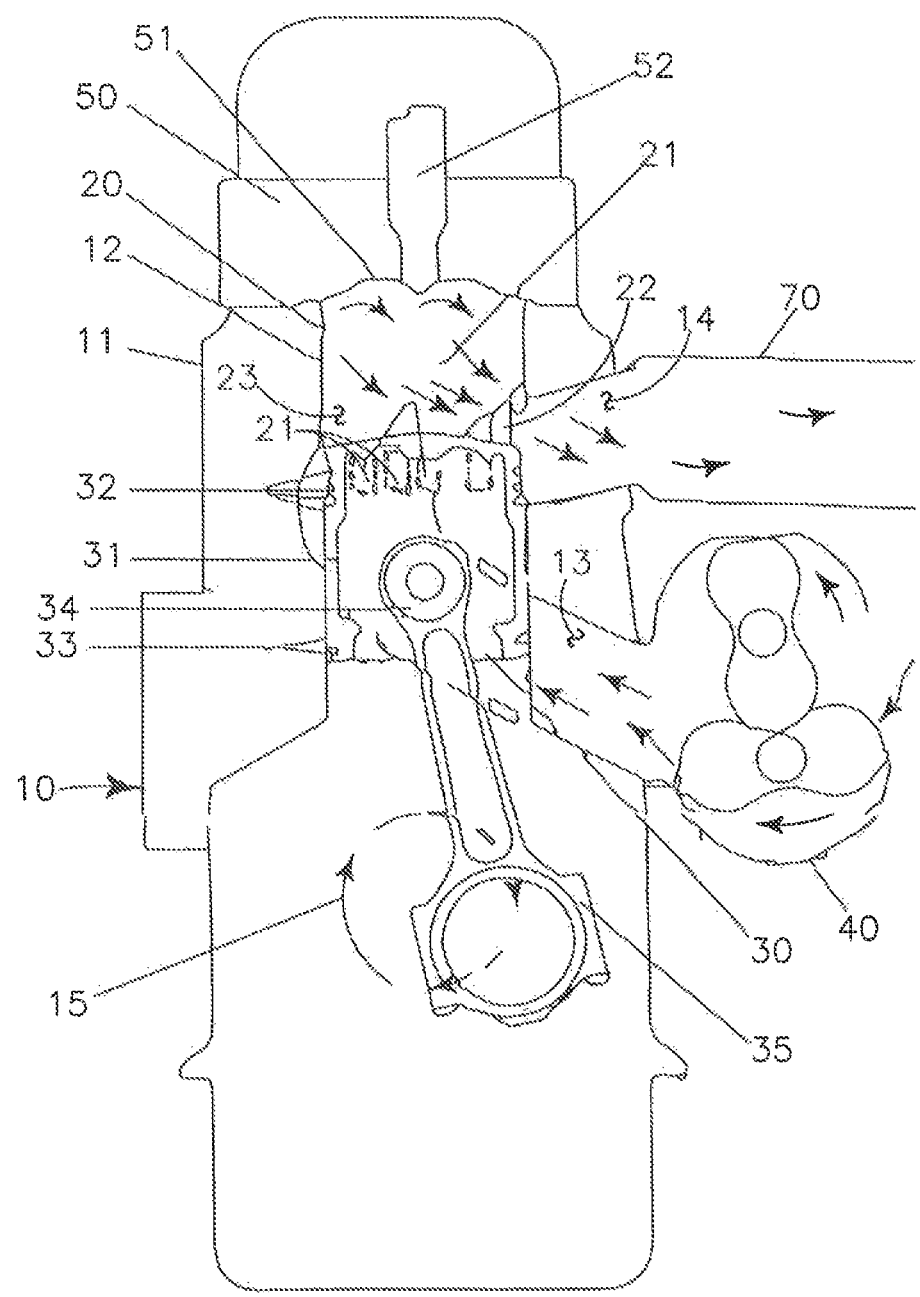
FIG. 4 is an orthographic cross-section view, similar to that of FIG. 1, during the exhaust phase of the downward stroke, showing with arrows the exhaust gasses' exit from the bore.

During the downward stroke of the piston 31 (FIG. 4) the exhaust ports 22 are uncovered, permitting the burnt gasses and steam (combustion products) to escape out the combustion chamber 51 and into the condensing heat recovery steam generator exhaust manifold 70. The exhaust ports 22 are uncovered by the piston 31 shortly before the air inlet ports 21 are uncovered, thus permitting a portion of the burnt gasses and steam to flow outwardly and the cylinder pressure to be lowered, before the air inlet ports 21 are uncovered by the piston 31. As soon as the air inlet ports 21 are uncovered (FIG. 1), fresh pressurized air is injected into the volume defined by the cylinder liner 20, and the cycle is repeated.

Steam is generated (and in some operating conditions superheated) using the heat of combustion. The heat recovery steam generator exhaust manifold 70 directly communicates with the exhaust passages 14. Pressurized water (not shown) flowing within coils 75, 76 of the heat recovery steam generator exhaust manifold 70 absorbs the heat of the exhaust gasses and that heat is transferred by radiation and convection to the water (not shown) within the coils 75, 76 to generate steam. The heat recovery steam generator exhaust manifold 70 operating pressure is between approximately 2800 psig and 4000 psig, and is supplied with water by means of a feed water pump 101. A temperature of approximately 650 to 800° F. is maintained within the heat recovery steam generator 70 so that homogeneous mixtures of steam and fuel can be generated and maintained. The homogeneous mixture of fuel, oil, and steam may be affected by adjusting the fuel injectors 52 to inject correct amounts of fuel, air, and steam into the combustion chamber 51. The correct amount of fuel to be injected may be dependent upon the desired horsepower output, load and temperature.

A supplemental burner 90 in the condensing heat recovery steam generator exhaust manifold 70 allows production of volumes of steam greater than the volume of steam that may be produced from the heat in the exhaust passage 14 alone. The volume of steam injected by the injector 52 during the combustion event directly influences the peak temperature of combustion. In normal operation, a combustion temperature of approximately 1000 F. or higher is desirably maintained at TDC so auto-ignition occurs. My invention's combination of fuel and steam at supercritical conditions results in a homogeneous mixture of fuel, oil, and water with ideal gas-like properties that provides more surface area to interact with combustion air as well as smaller droplet/particulate size, so that the quality of combustion is improved and formation of soot is minimized. Depending on the ratio of fuel to steam, additional injections of fuel or steam may be used to affect the peak combustion temperature.

In the preferred embodiment, the entire quantity of steam and liquid fuel for the power stroke is injected near TDC (FIG. 7). In another preferred embodiment, it is contemplated to inject a portion of fuel near TDC, and a portion of a mixture of fuel and steam after TDC. It is still further contemplated to inject a portion of a mixture of fuel and steam near TDC, and a portion of fuel after TDC. It is even still further contemplated to inject a portion of a mixture of fuel and steam at TDC, and a portion of a mixture of fuel and steam after TDC. When solid fuel, such as, but not limited to biomass, is used, the solid fuel is introduced into the improved engine as a slurry which is heated to supercritical conditions by the heat recovery steam generator prior to injection into the combustion chamber 51 through the injector 52.

The preferred method of fuel injection when my engine is operating on liquid fuel only is to inject all the fuel during the downward stroke near TDC. Steam present in the volume defined by cylinder liner 20 absorbs a large portion of the heat of combustion and said steam may become superheated during the downward stroke if the heat absorbed exceeds the temperature necessary for the steam to exist as saturated steam at its pressure.

Steam, and superheated steam, along with the heat of exhaust gasses then pass through the exhaust ports 22 and exhaust passage 14 to the condensing heat recovery steam generator exhaust manifold's 70 heat transfer surfaces (coils) 75. It is desirable to maintain a high specific power output so that there is enough heat in the exhaust passages 14 for the condensing heat recovery steam generator exhaust manifold 70 to receive an inlet temperature of approximately 700 F. or greater. A near constant exhaust gas temperature can be accommodated in a multi-cylinder engine (for example, FIG. 11) by allowing the majority of a load to be carried by selected cylinders 81. In this case, the selected cylinders 81 receive a greater amount of injected fuel than the idled cylinders 81. The condensing heat recovery steam generator exhaust manifold 70 communicating with the selected cylinders 81 receives sufficient heat from the exhaust passages 14 such that homogeneous mixtures of steam and fuel may continue to be generated. In the preferred embodiment, only the selected cylinders 81 receive injections of homogeneous mixtures of steam and fuel. It is also contemplated to distribute the homogeneous mixtures of steam and fuel to all the cylinders 81.

Figure 8:
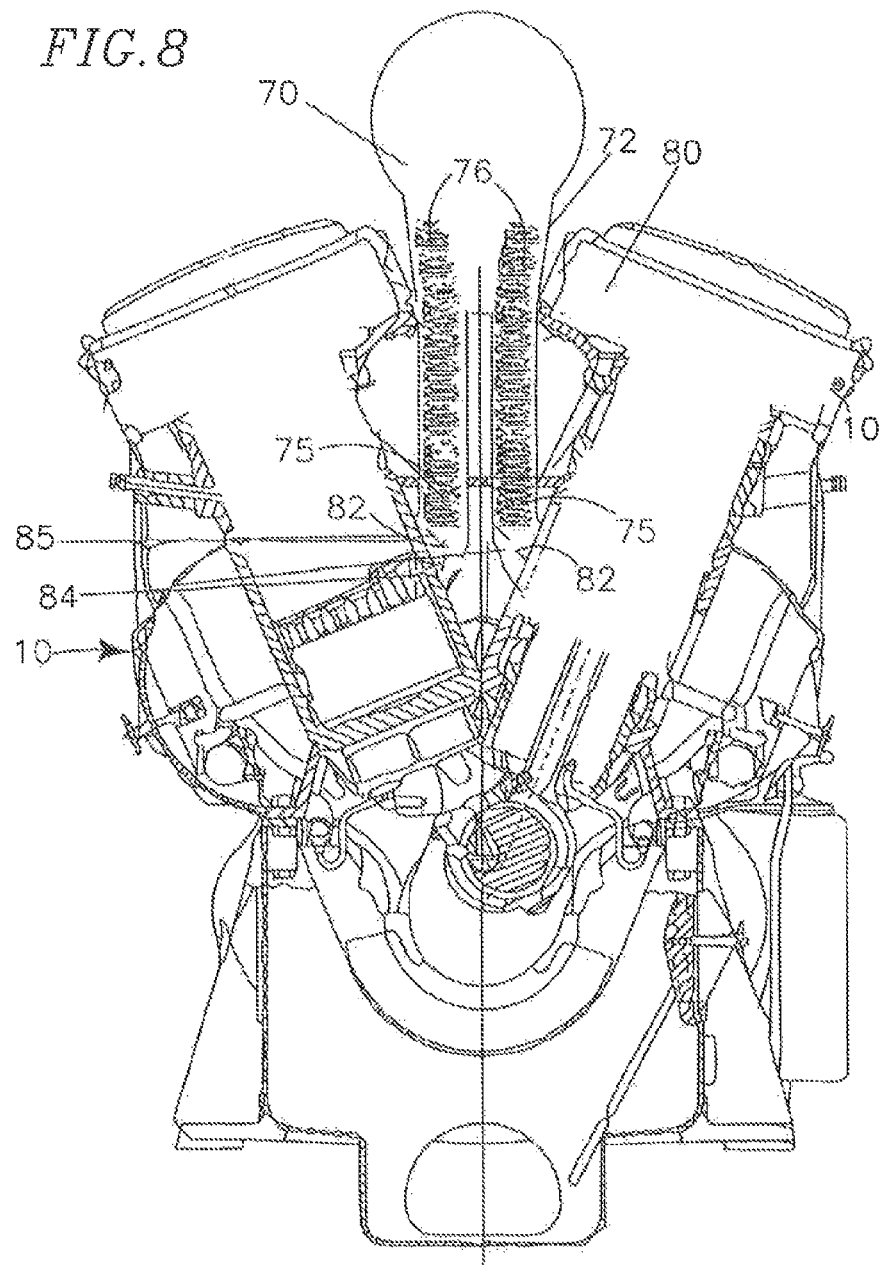
FIG. 8 is an orthographic vertical cross-section view of a 'V'-type loop scavenged dual cycle combustion and steam engine having a heat recovery steam generator between the cylinders.

FIG. 8 is an orthographic vertical cross-section view of a 'V'-type internal combustion steam engine of the instant invention showing a heat recovery steam generator manifold 70 carried between the spacedly adjacent piston cylinders. In this configuration, a steam recovery header casing 72 may extend directly to the engine block 80 proximate to the exhaust ports 82. If necessary, the header casing 72 may contain structural members such as braces (not shown) to reinforce the engine block 80.

Figure 5:
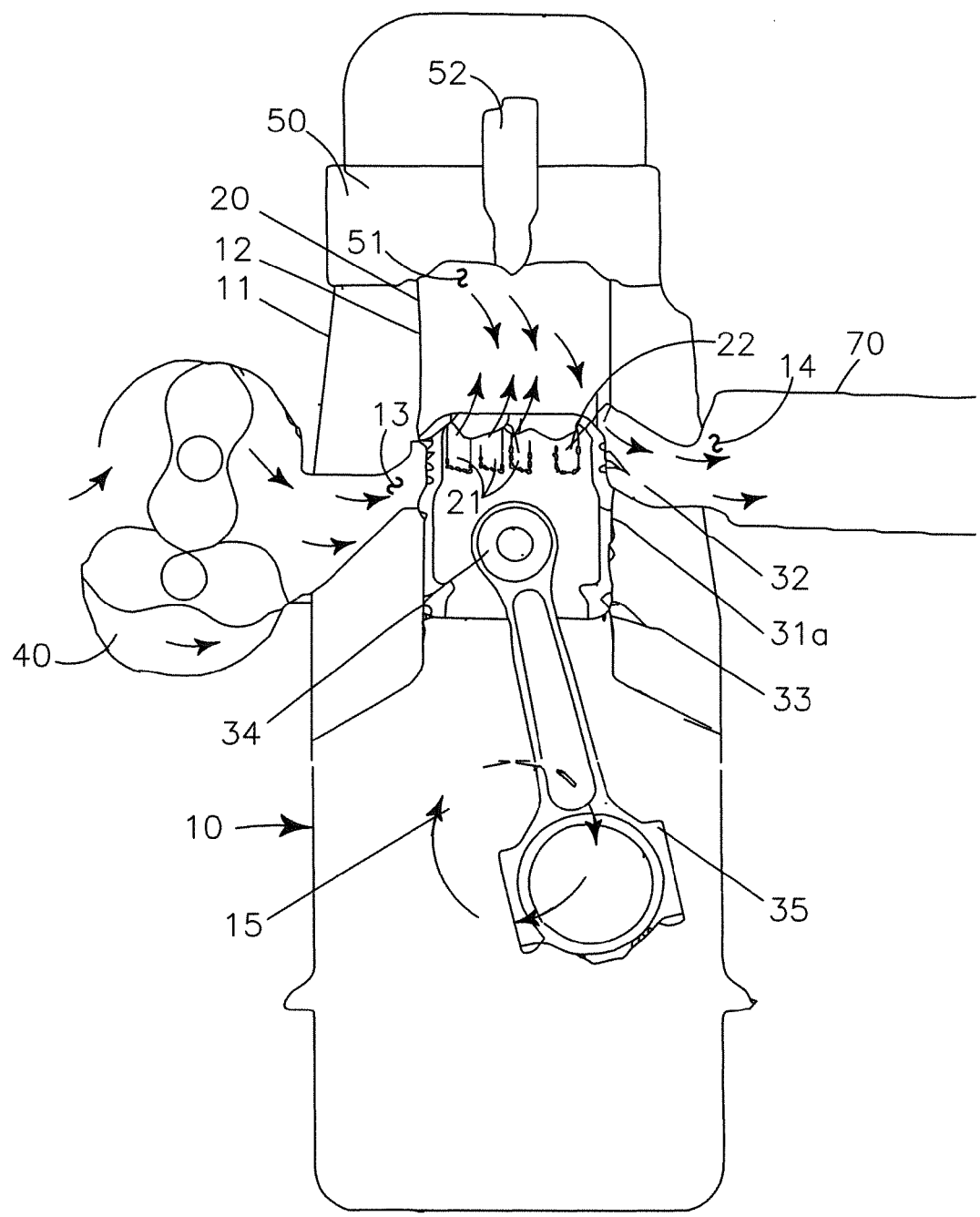
FIG. 5 is an orthographic cross-section view of a second preferred embodiment of my dual cycle internal combustion and steam engine showing air inlet passageways, exhaust passageways, and the piston during the exhaust phase of the downward stroke.

FIG. 5 shows a second embodiment of my dual cycle internal combustion and steam engine. The object of my second embodiment cylinder design is to accommodate and air inlet passage 13 directly opposite the exhaust passage 14, while preserving the loop scavenge effect. This arrangement is necessary in engines of the 'V'-type. (FIG. 8). While the air inlet passage 13 may still have an upward slope, it is not as pronounced as in an in-line engine embodiment, and therefore a ramped crown piston 31*a* provides additional guidance for the airflow. The ramped crown piston 31*a* may define a combustion chamber (not shown) within the piston 31*a*. The exhaust passage 14 in my second embodiment is downward sloping.

Figure 6:
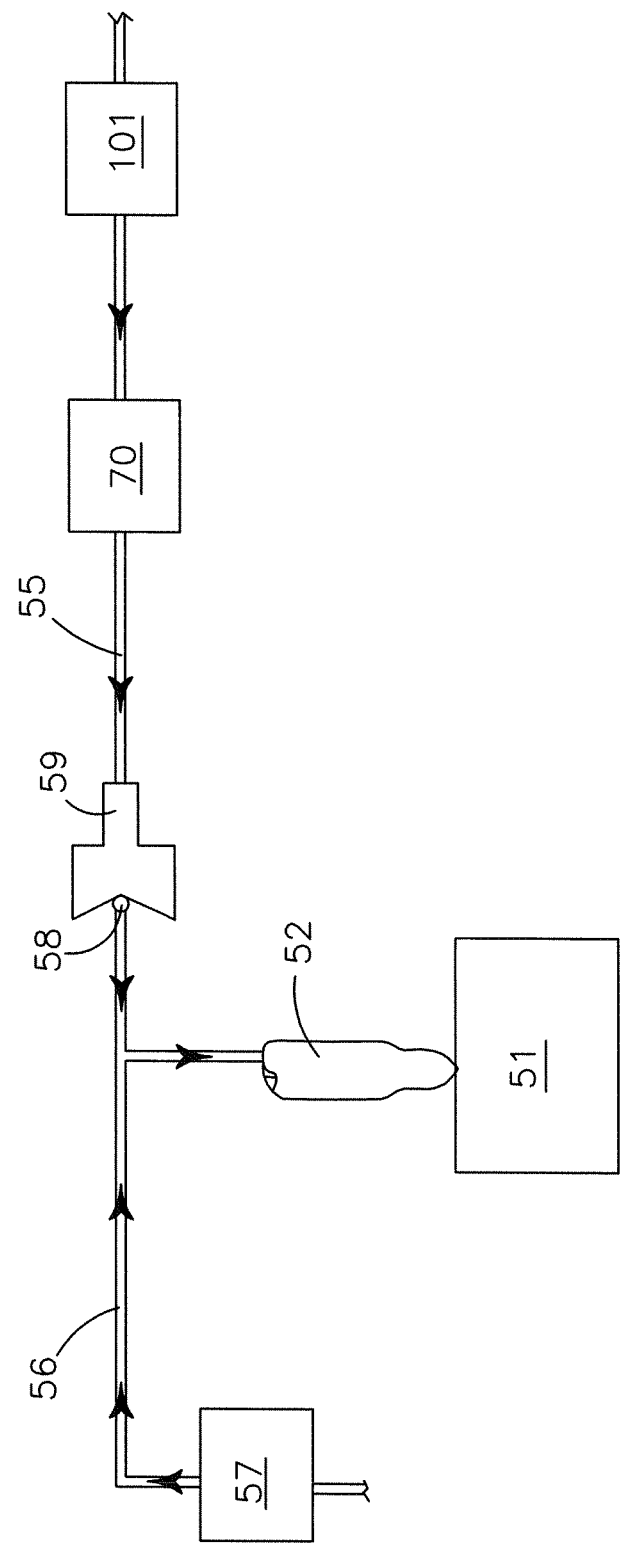
FIG. 6 is a diagrammatic block representation of a fuel injection and fuel/steam injector configuration for injecting fuel and steam into the combustion chamber.

FIG. 6 shows a block diagram of a supercritical steam and liquid fuel injector 52 communicates with a liquid fuel line 56 and a steam supply line 55. Injector 52 has a liquid fuel line 56 that also communicates with the fuel supply (not shown) and the fuel pump 57. A filter 59 and a check valve 58 communicate with the steam line 55 between heat recovery steam generator 70 and the feed water pump 101 and the injector 52. The check valve 58 only opens to allow steam into the injector 52 one up we determine pressure is attained. Absence of the predetermined pressure causes the check valve 58 to close and block steam flow to the injector 52. In this instance, the improved engine will operate solely using fuel from the fuel lines 56 and fuel pump 57. In another preferred embodiment, a solid fuel injector (not shown) may be used in conjunction with the liquid fuel injection 52 for my engine to burn and operate using solid fuel. The solid fuel injector (not shown) when used in addition to the liquid fuel injector 52 is preferable placed in the steam supply line 55.

FIG. 7 is a diagrammatic view of the events described herein and illustrated in FIGS. 1 to 5. It should be noted that alternative embodiments, which meet different operating requirements of the engine and result in a different number and size of the inlet and exhaust ports may affect the timing shown by approximately ±10 degrees.

Figure 9:
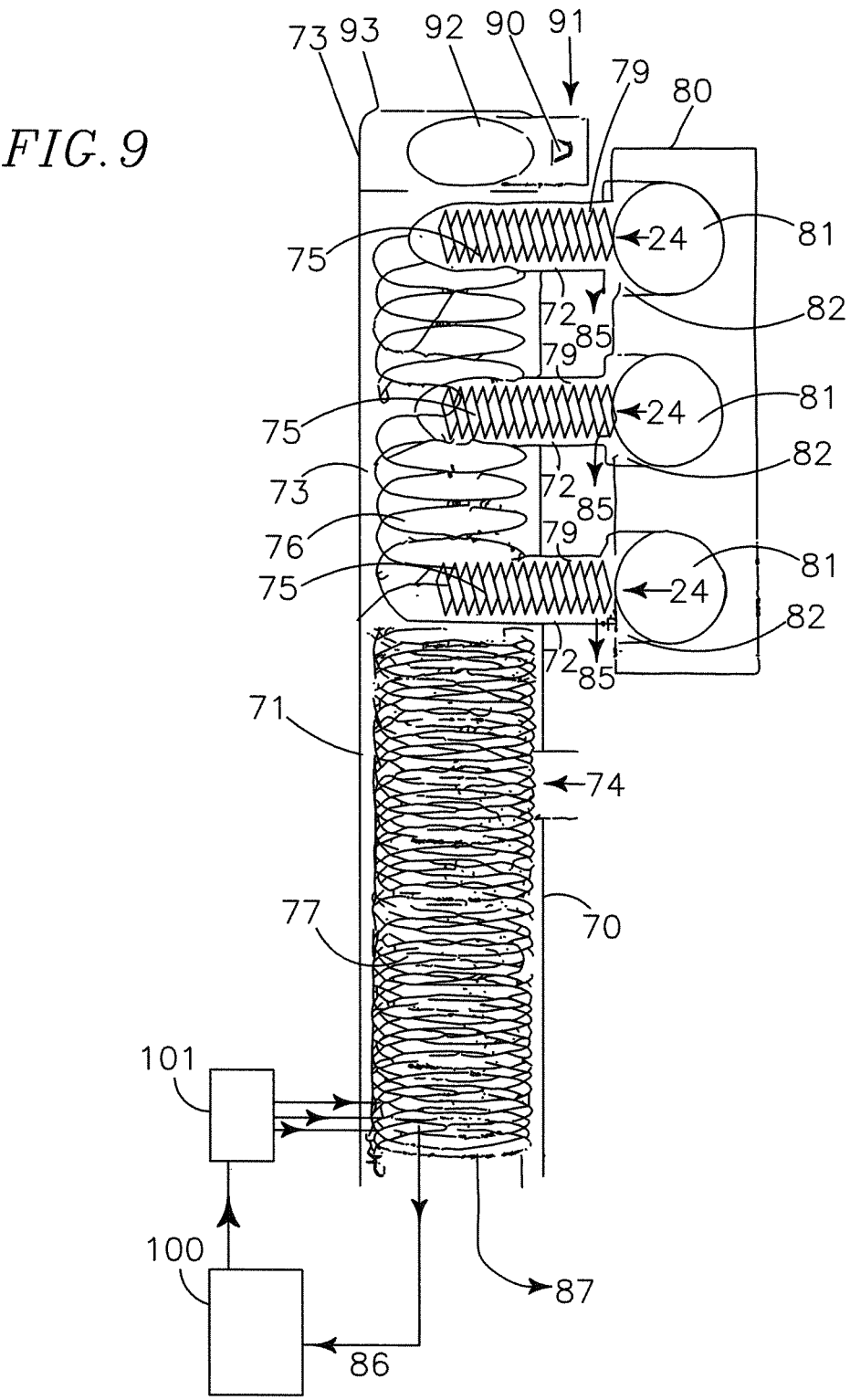
FIG. 9 is an orthographic horizontal cross-section plan view of a first embodiment of a condensing heat recovery steam generator system for a multiple cylinder engine showing the heat recovery coils communicating with the exhaust ports.
Figure 10:
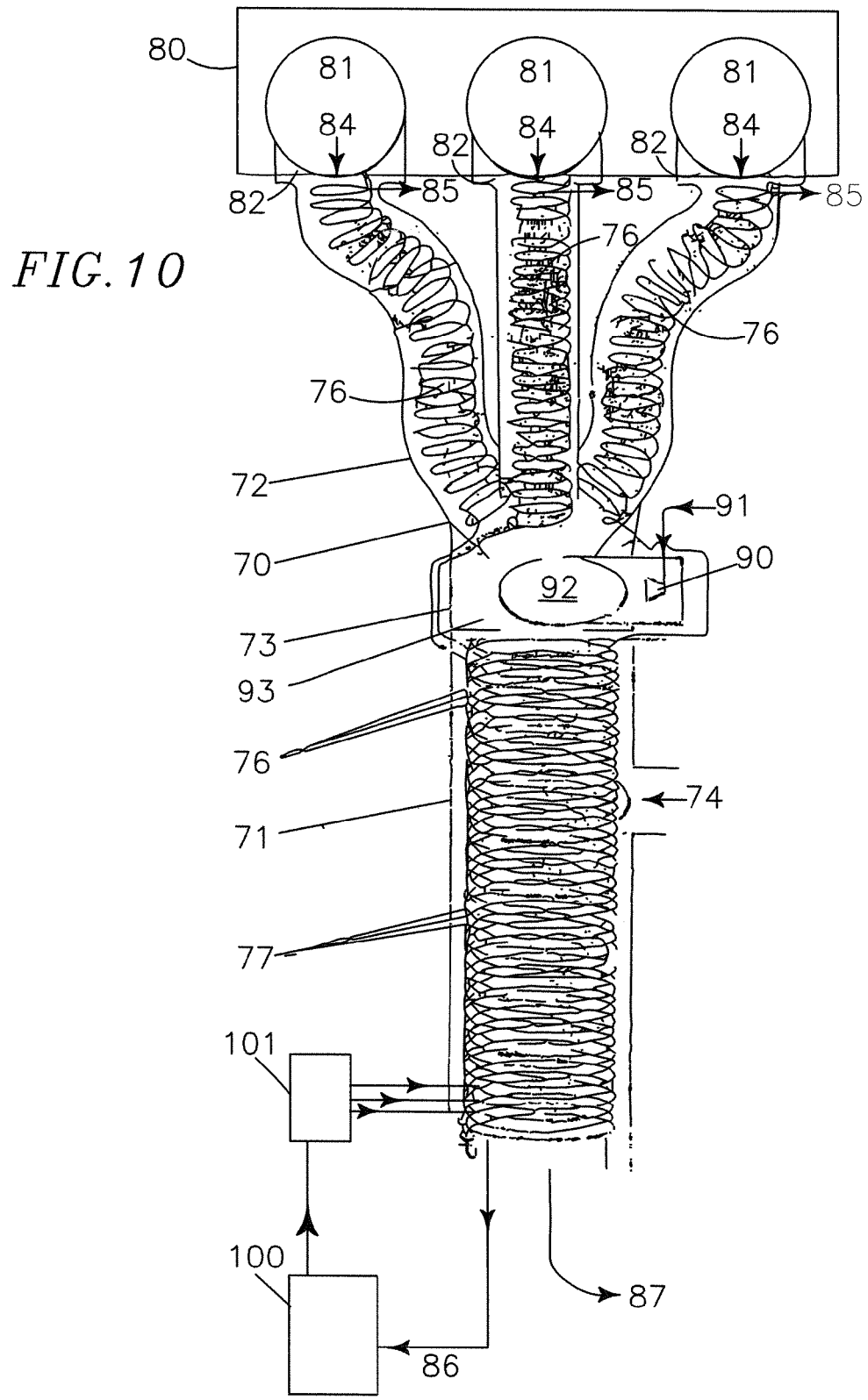
FIG. 10 is an orthographic horizontal cross-section plan view of a second embodiment of a condensing heat recovery steam generator system for a multiple cylinder engine showing the heat recovery coils communicating with the exhaust ports.

FIGS. 9 and 10 show a preferred embodiment of my condensing heat recovery steam generator exhaust manifold for my internal combustion and dual cycle internal combustion and steam engines. the HSRG 70 is comprised of a main casing 71, a header casing 72, and a burner casing 73 the casings 71, 72, 73 define medial channels 79 carrying heat recovery surfaces such as, but not limited to, fluid carrying coils 75, 76 and 77.

The header casings 72 are releasably secured to the engine as close to the engine block's 80 exhaust ports 22 as possible. The casing's 72 medial channels 79 directly communicate with the exhaust ports 22. Header coils 75 are carried within the medial channels 79, and are positioned side by side in each header casing 72a (FIGS. 9, 10). Multiple header coils 75 may be tandem wound to increase flow rate for a given header coil 75. The header coils 75 are carried within in the header casings 72, and communicate with longer/larger main coils 76 carried within the main casing 71.

The main coil 76 surface area is sized and configured and wound to reduce the temperature of the exhaust gas to approximately between 200 F. and 300 F.

An auxiliary condenser port 74 may be provided in the main casing 71. Main coils 76 extending distally beyond the auxiliary condenser port 74 opposite the header casings 72 are referred to as condenser coils 77. Valves or other known devices may be placed at unions of the main coils 76 and condenser coils 77 to denote the termination of the steam generating section to comply with American Society of Mechanical Engineers Boiler Code jurisdictional requirements.

Header coil 75 and main coil 76 material in the steam generation section may consist of, but not be limited to, materials such as Inconel, SA-106 A&B, or molly alloy seamless pipe, whereas condenser coils 77 may be of, but not limited to, copper nickel alloy or stainless steel alloy.

Header coils 75, main coils 76, and condenser coils 77 are wound such that an interior generally forms a gas passage, within the casing providing positive sealing and support of the coils 75, 76, 77. Gas turbulators (not shown) may be used to break up linear air flow and reduce channeling of the exhaust gas 84.

The condenser coils 77 form sufficient surface area to condense steam within the exhaust gas 84 to liquid water, which exits from a water outlet 86, and non-condensable gasses escape from a non-condensable gas outlet 87. Condensate tank 100 is supplied water from the water outlet 86, and contains known baffles and known filters to remove any impurities before supplying a multi-circuit feedwater pump 101 to recirculate the water through the coils 15, 16, 17.

A burner 90 may provide an auxiliary heat source and use the same fuel type as the engine, provided thereto through fuel inlet 91. The burner 90 has a tangential entry 92 into the combustion chamber 93, which may be of a stainless steel alloy and lined with high temperature castable refractory material.

FIG. 10 shows a header-type condensing heat recovery steam generator exhaust manifold 60. The structural difference between the manifold-type condensing heat recovery steam generator exhaust manifold 70 of FIG. 9 and the header-type manifold 70 shown in FIG. 10 is that the header casings 72 converge to the main body 70 with an equal amount of heating surface and gas volume, to the burner casing 73, which also serves as a header collector. Counterflow heat and water flows (not shown) and the header convergence reduce exhaust gas backpressure, improving efficiency.

Figure 11:
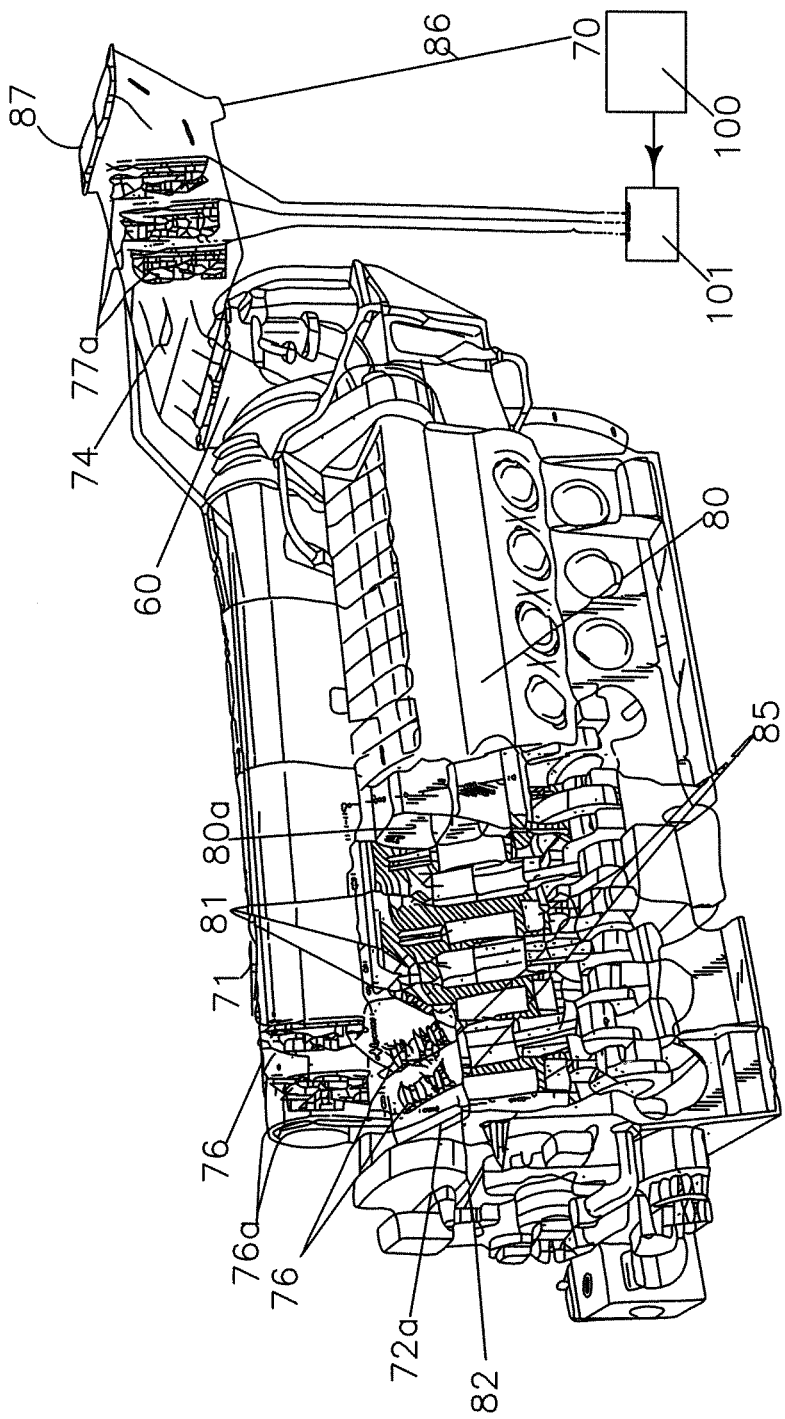
FIG. 11 is an isometric partial cutaway front, side, and top view of a 'V'-type multiple cylinder engine containing a condensing heat recovery steam generator exhaust manifold.
Figure 12:
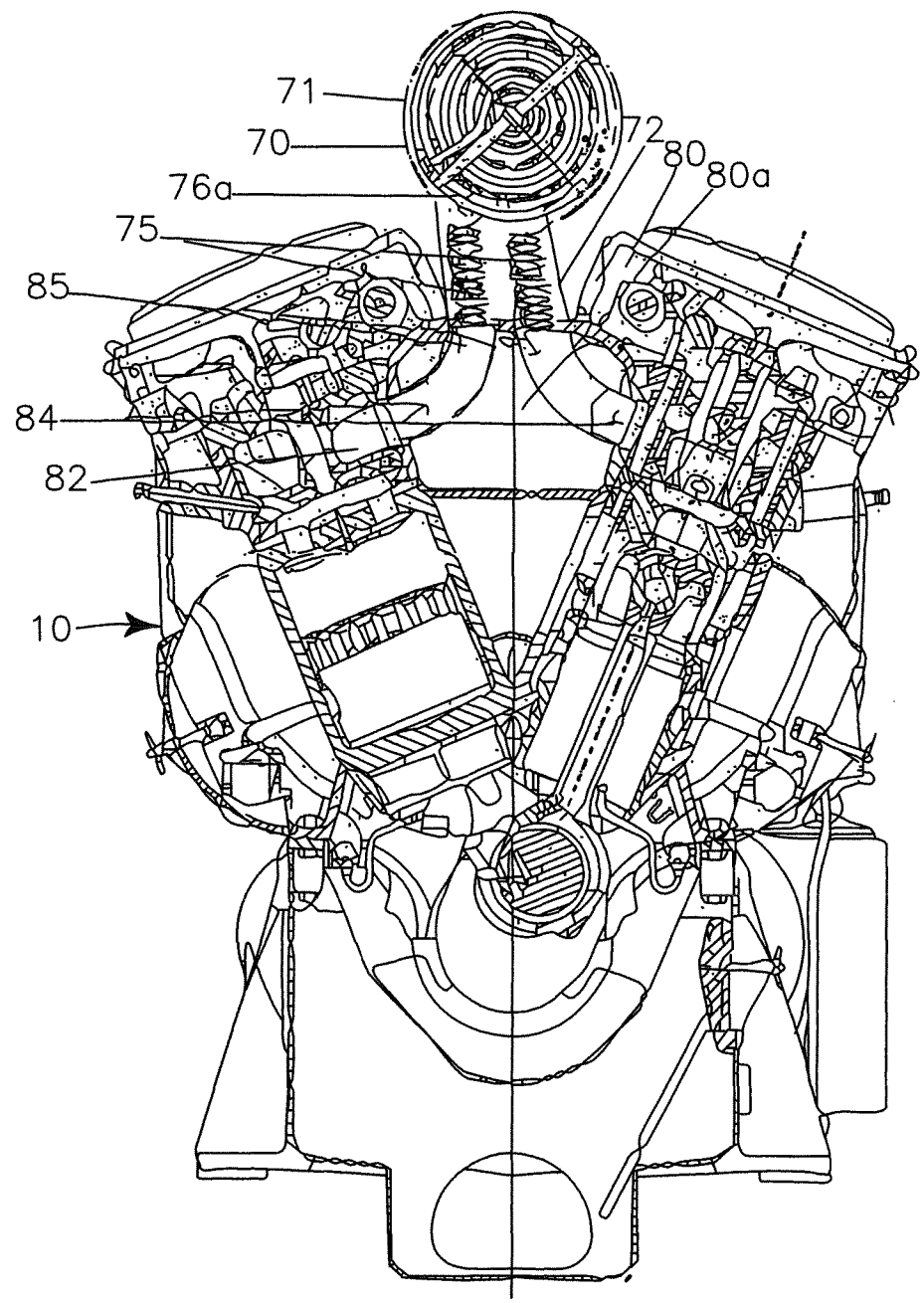
FIG. 12 is an orthographic vertical cross-section view of the engine of FIG. 11 taken along a centerline of one set of cylinders.

FIG. 11 shows a condensing heat recovery steam generator exhaust manifold 60 installed on a V'-block type engine, with exhaust ports 82 in the valley of the block 80a such as an Electro Motive Diesel (EMD) type engine, such as the Series 567, Series 645, and Series 710, having numbers of cylinders ranging from approximately 8 to 20.

Having described the structure of my invention, its operation may be understood. In operation, my invention may operate as follows:

My invention can operate in three different modes. The engine can transition from mode to mode with a control system, which can be automated or manual. The invention can operate on pure fuel, fuel/water mixture, or fuel/steam mixture, or pure steam. In its first mode of operation, my invention can operate on pure diesel fuel as an internal combustion engine when it is initially starting up. It can also run on pure diesel fuel anytime.

In this mode, the engine is started using an external energy source such as a battery (not shown) which heats glow plugs (not shown) and powers a starter motor (not shown) to rotate the crankshaft 15 and move the pistons 31 within the cylinder sleeves 20. As the piston(s) 31 moves upwardly within the cylinder sleeve 21 air within the cylinder medial chamber 23 is compressed which responsive generates heat. As the piston 31 reaches a position known as Top Dead Center an amount of fuel is injected into the combustion chamber 51 through the injector 52. The heat within the combustion chamber 51 causes the fuel to combust generating expanding gasses, heat and pressure. The increased pressure drives the piston 31 downwardly within the cylinder sleeve 20.

As the piston moves down, the exhaust moves out the exhaust ports and into the main casing 71 and 73 of the condensing heat recovery steam generator exhaust manifold 70, in which the coils 75, 76 absorb the heat and heat the water contained within the coils 75 and 76.

In the second mode of operation, the heat absorbed by the coils can be used to produce steam to recirculate to the engine. The engine's waste heat of combustion is directed with the exhaust gasses to the HRSG 70, which generates steam that is injected back into the engine fuel line 56 to increase torque, power, and combustion And cylinder pressure to augment combustion pressure.

The condensing heat recovery steam generator exhaust manifold 70 operates at a pressure of between approximately 3200 psig and 4000 psig, with a steam outlet temperature of between approximately 680 F. and 750 F. The temperature and pressure may be reduced while still providing useful waste heat recovery. The flow of exhaust gasses 84 through the condenser coils 75, 76 and 77 heats the water flowing through the header coils 75. The temperature of the water in the condenser coils 77 and header coils 75 is monitored using known devices at the beginning of each section and at the steam outlets 85, and the flow of water and steam through the coils 75, 76, 77 is regulated through each coil 75, 76, 77 to maintain the desired temperature by a multi circuit feedwater pump 101.

Steam production at the desired temperature is maximized at low engine output levels by selectively un-loading or shutting down cylinders 81. The cylinders 81 remaining in service (producing power and heat) can then provide higher temperature exhaust gas 84 to generate steam and the individual flows of steam through the coils 75, 76, 77 is adjusted to maintain the desired temperature for the individual heat ejection rates of each cylinder 81. If the steam temperature or volume is insufficient, an auxiliary burner 90 may be activated to raise the temperature of the exhaust gas to raise the temperature of the water and steam production.

The coils 75, 76, 77 of the HRSG 70 can also be used to condense the steam to water. Operated in this mode, the condenser coils 77 lower the temperature of the exhaust gasses 84 such that water is recovered. The water exits from a water outlet 86, and non-condensable gasses escape from a non-condensable gas outlet 87. Condensate tank 100 is supplied water from the water outlet 86, and contains known baffles and known filters to remove any impurities before supplying a multi-circuit feedwater pump 101.

In a third mode, the invention can operate purely as a steam engine on steam that can be obtained from an outside steam generator. Separating water from hydrocarbons, where a 4 MW EMD (Electro-Motive Diesel) generator could burn less than approximately 160 gallons of diesel per hour (depending on the hydrocarbons in the waste fracking water) and process over approximately 1,000 gallons of that water per hour.

An improved internal combustion and waste heat steam engine having a Heat Recovery Steam Generator, thermally optimized for the steam cycle, that can operate on steam, fuel, or a water-fuel composition where the mixture is at a critical temperature and in a homogeneous single phase. The condensing waste heat recovery steam generator exhaust manifold is close-coupled to the engine cylinder exhaust ports and provides heat to create the homogeneous mixture and steam. The primary heat source is internal combustion. An external heat source may be coupled with the engine to increase the heat available to the condensing waste heat recovery steam generator exhaust manifold to produce additional steam. The engine can be operated as a pure diesel engine, either for warm-up or for when an external source of steam is desired.

It is finally contemplated that my improved engine be used for pollution control, such as by consuming waste water generated in fracking operations.

Having thusly described my invention, I file this Utility Patent Application and request issuance of Utility Letters Patent.

I claim:

1. An improved internal combustion and steam engine having an engine block defining a cylinder bore forming a combustion chamber and carrying a reciprocally moving piston within the cylinder bore, the piston interconnected to a connecting arm communicating with a crankshaft opposite the piston to rotate the crankshaft as the piston moves reciprocally within the cylinder bore, the engine further having a fuel supply and an air supply, the improvement comprising in combination:

an air inlet port and an exhaust port defined in a circumferential surface of the cylinder bore, the air inlet port communicating with an air inlet passage and an air moving means for injection of air into the combustion chamber and the exhaust port communicating with an exhaust passage so that combustion products exit the combustion chamber, the position and dimensions of the air inlet port and the exhaust port are such that as the piston moves reciprocally within the cylinder bore the air inlet port and the exhaust port are opened and closed;

an injector communicating with the combustion chamber and the fuel supply to inject fuel into the combustion chamber resulting in ignition of the injected fuel when the piston compresses the air fuel mixture within the combustion chamber to ignition temperature;

a heat recovery steam generator communicating with the exhaust ports to collect and channel combustion products exiting the exhaust ports, the heat recovery steam generator defining an interior channel carrying fluid filled coils which are exposed to the combustion products causing the fluid within the coils to absorb heat and become steam which is communicated to the injector for injection of the steam into the combustion chamber to increase engine performance and to absorb combustion heat; and an injection pump communicating with the fuel supply to meter the volume of fuel injected into the combustion chamber through the injector and the timing of the injection of the fuel.

2. The improved internal combustion and steam engine of claim 1 further comprising:
    a burner communicating with the coils of the heat recovery steam generator to heat the fluid within the coils to convert the fluid to steam for injection into the combustion chamber through the injector.

3. The improved internal combustion and steam engine of claim 2 wherein:
    the steam produced by the burner allows the improved engine to operate as a steam engine.

4. The improved internal combustion and steam engine of claim 2 wherein:
    the steam generated by the burner communicating with the coils of the heat recovery steam generator is heated to a supercritical temperature and pressure for injection into the combustion chamber through the injector.

5. The improved internal combustion and steam engine of claim 1 further comprising:
    a steam condenser within the heat recovery steam generator to remove steam from the combustion products passing through the channel defined by the heat recovery steam generator.

6. The improved internal combustion and steam engine of claim 1 wherein:
    the air moving means pressurizes the air passing through the air inlet ports and into the combustion chamber.

7. The improved internal combustion and steam engine of claim 1 wherein:
    the air moving means is a supercharger.

8. The improved internal combustion and steam engine of claim 1 wherein:
    the air moving means is a turbocharger.

9. The improved internal combustion and steam engine of claim 1 wherein:
    the fuel air mixture injected into the combustion chamber is a homogenous mixture having ideal-gas-like properties.

10. The improved internal combustion and steam engine of claim 1 wherein:
    steam is injected into the combustion chambers only when the heat recovery steam generator has reached a pressure of between approximately 2,500 psig and 4,500 psig and a temperature of approximately between 550 F. and 850 F. which is required to create a homogenous mixture of fuel and steam.

11. The improved internal combustion and steam engine of claim 1 wherein:
    the engine may be operated purely as a diesel engine using fluidic fuel.

12. The improved internal combustion and steam engine of claim 1 wherein:
    the engine may be operated using solid fuel.

13. The improved internal combustion and steam engine of claim 1 wherein:
    the engine may be operated using a combination of diesel fuel and steam.

14. The improved internal combustion and steam engine of claim 1 wherein:
    during operation a piston within a cylinder may be idled to reduce fuel consumption.

15. The improved internal combustion and steam engine of claim 1 wherein:
    the injection of steam in the combustion chambers reduces the heat of fuel combustion reducing the need for an auxiliary fluid cooling system for the engine.

16. The improved internal combustion and steam engine of claim 1 wherein:
   the injection of steam in the combustion chambers reduces the heat of fuel combustion eliminating the need for an auxiliary fluid cooling system for the engine.

17. The improved internal combustion and steam engine of claim 1 wherein:
   the air inlet ports and the exhaust ports are spacedly arrayed about the cylinder proximate a lower end portion of the combustion chamber allowing the engine to operate as a uniflow design.

18. The improved internal combustion and steam engine of claim 1 wherein:
   the air inlet passage is angled upwardly to cause pressurized input air to pass through the air input ports and sweep combustion products from the combustion chamber and out the exhaust ports.

19. The improved internal combustion and steam engine of claim 1 wherein:
   the injection of a homogenous mixture of fuel and steam into the combustion chamber effects more efficient combustion and reduces formation of soot and combustion byproducts.

\* \* \* \* \*